United States Patent Office.

WILLIAM A. MARTIN, OF RED RIVER LANDING, LOUISIANA.

PROCESS OF OBTAINING PURE JUICE FROM SUGAR-CANE, &c.

SPECIFICATION forming part of Letters Patent No. 246,900, dated September 13, 1881.

Application filed May 15, 1880. (No specimens.)

*To all whom it may concern:*

Be it known that I, WILLIAM AUGUSTUS MARTIN, a citizen of the United States, residing at Red River Landing, in the parish of Pointe Coupée and State of Louisiana, have invented a certain new and useful Process of Obtaining Pure Juice from Sugar-Cane, Sorghum, and other Sacchariferous Plants, in a condition for concentration into sugar; and I do hereby declare that the following is a full, clear, and exact description of the invention, which will enable others skilled in the art to which it appertains to make and use the same.

Heretofore the mode generally used for obtaining the juice has been by expression through rollers, the principal defects of which are that from ten to forty per cent. of the juice remains in the bagasse after expression, and that the juice so obtained is charged with all the feculant matter of the plant forced out with it by the process. This latter defect is of the greatest magnitude and entails the necessity of defecation, which, by the present system, results in converting a large portion of the sugar into molasses or uncrystallizable sugar, amounting in most instances to fifty per cent.

The object of my invention is to give to the sugar-maker a means of obtaining a juice free from all the impurities naturally associated with it, and which is at once in a condition to be converted into sugar.

To carry my invention into effect I cut the stalks into slices one-tenth of an inch thick and fill a vessel with them. I then submit the mass to a steam-pressure, which instantly, on contact with the slices, coagulates the albumen and its associate impurities, rendering them insoluble, and, displacing the juice, drives it down before it until it issues from the faucet at the bottom of the vessel the pure and unmixed juice of the plant. The steam, having performed its functions, is then shut off, and a charge of water, in quantity sufficient that when added to the displaced juice the whole will measure ninety per cent. of the weight of the slices used, is admitted. By any suitable device for stirring, the mass is then agitated for about twenty minutes, with the water, until every portion of it has been submitted to its solvent influence. It is then run off into the same receiver with the first juice. This mixed fluid in the receiver holds nearly all the sugar of the substance under treatment, contains no impurity, (hence it is but very slowly affected by the oxygen of the atmosphere,) and requires little or no lime to neutralize its slight natural acidity. A second charge of water is now introduced, the agitation of the mass repeated, and after a few minutes washing this second fluid, (the same in quantity as the first,) containing the residue of the sugar, is allowed to run off into a receptacle, to be used as the first washing-fluid of the next charge of slices, and the exhausted bagasse is allowed to fall from the bottom of the vessel. I may, for convenience, use two or more vessels in a series, so that the cane-cutter shall be continuously at work without any alteration in the routine of the work, the last washing of one vessel being always used for the first washing of the next in rotation. Thus not more than ninety per cent. of fluid will have to be manipulated, which will contain all the sugar previously existing in the plant without change or alteration.

In defining my invention more clearly, I would state that I am aware that the cane-stalks have been crushed, cut, and then steamed, as in Patent No. 143,089; but this allows the juice at once to become fouled by the feculant matters which are expressed by the mechanical rupture of the cells. I am also aware of the diffusion method as described in Patent No. 210,158, in which the juice is dissolved in water, and of the maceration method described in Patent No. 137,146. None of these, however, operate on the same principle as my invention, nor are they capable of producing the same results.

My invention is distinctive in the following respects—*i. e.*, in that I employ simply steam without any mechanical disruption of the cells, the steam acting in a twofold way: first, to coagulate the albuminous matters and prevent their expulsion and admixture with the juice; and, secondly, the pressure of the steam serving to displace the juice, which runs out practically cold.

Having fully described my invention, what I desire to claim, and to secure by Letters Patent, is—

1. The method of extracting cane-juice from the stalk in a pure condition, unmixed with fecula, which consists in displacing the pure juice from its embodiment in the uncrushed stalk-cells by the simple and direct application of steam-pressure, whereby the albuminous matters are coagulated and the juice displaced by the same agency, as described.

2. The method of extracting cane-juice from the stalk in a pure condition, unmixed with fecula, which consists in displacing the pure juice from its embodiment in the uncrushed stalk-cells by the simple and direct application of steam-pressure, and then washing out the juice remaining in the partially-exhausted chips, as described.

WILLIAM AUGUSTUS MARTIN.

Witnesses:
I. TORRAS,
W. C. NELSON.